United States Patent
Cohen

(10) Patent No.: US 8,290,635 B2
(45) Date of Patent: Oct. 16, 2012

(54) REDUCING POWER CONSUMPTION IN A NETWORK BY DETECTING ELECTRICAL SIGNATURES OF APPLIANCES

(75) Inventor: Avner Cohen, Kfar Haoranim (IL)

(73) Assignee: Greenlet Technologies Ltd, Tel Aviv (IL)

( * ) Notice: Subject to any disclaimer, the term of this patent is extended or adjusted under 35 U.S.C. 154(b) by 307 days.

(21) Appl. No.: 12/821,208

(22) Filed: Jun. 23, 2010

(65) Prior Publication Data
US 2010/0305773 A1 Dec. 2, 2010

Related U.S. Application Data

(63) Continuation-in-part of application No. PCT/IL2008/001672, filed on Dec. 25, 2008.

(60) Provisional application No. 61/016,604, filed on Dec. 26, 2007.

(51) Int. Cl.
*G06F 19/00* (2011.01)
(52) U.S. Cl. ............. 700/295; 702/60; 702/61; 340/657
(58) Field of Classification Search ................... 700/295; 340/657; 702/60, 61
See application file for complete search history.

(56) References Cited

U.S. PATENT DOCUMENTS

| | | | |
|---|---|---|---|
| 4,858,141 A * | 8/1989 | Hart et al. | 702/61 |
| 6,828,771 B1 | 12/2004 | Ghassemi | |
| 6,934,862 B2 | 8/2005 | Sharood et al. | |
| 2005/0020967 A1 | 1/2005 | Ono | |
| 2009/0072985 A1 * | 3/2009 | Patel et al. | 340/657 |
| 2010/0280978 A1 * | 11/2010 | Shimada et al. | 706/12 |
| 2010/0305773 A1 * | 12/2010 | Cohen | 700/296 |
| 2011/0112780 A1 * | 5/2011 | Moss | 702/62 |
| 2011/0184580 A1 * | 7/2011 | Kawamoto et al. | 700/295 |
| 2011/0251807 A1 * | 10/2011 | Rada et al. | 702/61 |
| 2011/0307200 A1 * | 12/2011 | Hsu et al. | 702/61 |

OTHER PUBLICATIONS

"Using Appliance Signatures for Monitoring Residential Loads at Meter Panel", Sultanem et al, IEEE Transactions on Power Delivery, vol. 6, No. 4, Oct. 1991.*
"Nonintrusive Appliance Load Monitoring", George W. Hart, Columbia University, IEEE 1992.*
"Real-Time Recognition and Profiling of Appliances through a Single Electricity Sensor", Ruzzelli et al, Clarity: Centre for Sensor Web Technologies, IEEE Secon 2010.*

(Continued)

*Primary Examiner* — Michael D Masinick
(74) *Attorney, Agent, or Firm* — The Law Office of Michael E. Kondoudis

(57) ABSTRACT

An apparatus, system and methods system for reducing power consumption in a network including electrical appliances connected via electrical outlets to an electricity supplier and/or a system managing power consumption. The system comprises a management system and apparatuses, each comprising a measurement unit, a processing unit, an optional communications unit and a control unit, such that each apparatus is connected to an electrical outlet and is associated with an appliance or a group of appliances. Control units inject electrical signals via the associated electrical outlet to the electrical appliance. The measurement unit measures electrical parameters at the outlet, and the processing unit analyzes the electrical parameters measured in view of the electrical signal and detects the electrical signature of the associated electrical appliance therefrom. The electrical signature is utilized to characterize various characteristics of the electrical appliances and manage power consumption of the network.

15 Claims, 5 Drawing Sheets

OTHER PUBLICATIONS

International Search Report of the International Searching Authority for PCT patent application No. PCT/IL2008/001672 issued on Apr. 24, 2009.

Written Opinion of the International Searching Authority for PCT patent application no. PCT/IL2008/001672 issued on Apr. 24, 2009.

* cited by examiner

REDUCING POWER CONSUMPTION IN A NETWORK BY DETECTING ELECTRICAL SIGNATURES OF APPLIANCES

CROSS REFERENCE

This application is a continuation-in-part of International Patent Application No. PCT/IL2008/001672 filed Dec. 25, 2008, which claims the benefit of U.S. Provisional Patent Application No. 61/016,604 filed Dec. 26, 2007, both of which are incorporated herein by reference in their entireties.

TECHNICAL FIELD

The present invention relates to the field of power consumption and power control, and more particularly, to utilizing electrical signatures.

BACKGROUND OF THE RELATED ART

Prior to setting forth the background of the related art, it may be helpful to set forth definitions of certain terms that will be used hereinafter.

The term "electrical signature" as used herein in this application, is defined as parameters of a signal received from an electrical appliance. The electrical signature may be characterized by continuous and/or discrete waveforms of current, power and/or voltage and are typical to appliances, working modes, connectivity types etc.

The term "outlet" as used herein in this application, is defined as a wall mounted and/or pluggable electrical plugs and sockets. An outlet may connect to AC (Alternating Current) or DC (Direct Current) power cable on one side (the "network" side, referring to the electrical grid or generator side), and may be connected to an AC or DC power cable (or cables) on the other side (refers to the appliances side). The cable(s) on the appliance side may connect to one or more appliances. The cable on the appliance side and the network side may or may not be connected to the outlet at a certain moment. AC outlets include both single phase outlets and three-phase outlets. The term "outlet" herein may refer to a single plug and socket or a strip of plugs and sockets. The term "outlet" also includes implementations and devices where such outlet is implemented as a subunit in an appliance.

Although AC power supply is characterized by a sinusoidal voltage, non-linear loads may draw non-sinusoidal current which is characterized by added harmonics to the original sinusoidal supply. Non-linear loads are exhibited e.g. by saturated magnetic such as transformers and rotating machines, fluorescence light, power electronic load such as switched mode power supply, rectifiers (e.g. DC motors, regulated PS, battery chargers) and inverters.

As electricity prices rise, the need for energy management systems and energy saving systems becomes crucial. Existing energy management systems are able to manage special appliances that employ special communications and remote control capabilities. Alternatively energy management systems manage appliances inefficiently, without having accurate information on the appliance status, the power it consumes and whether it is turned ON.

There is a need for reducing peak consumption from the electric network, as the peaks are those that demand most efforts to overcome by electric companies, and as a result cause most marginal damage to consumers relying on the electric network and to the environment. There is also an interest for reducing overall consumption from the electric network, to save money, reduce pollution and help the environment.

Existing solutions to the problem of reducing peak and non-peak demands require professional installation at customer premises, and reliable end-to-end management systems, which are difficult to achieve. Alternatively, customers are being asked to reduce consumption at peak and non-peak periods, but not always have the tools to control their consumption, nor do the suppliers have the tools to control the customers.

U.S. Patent Publication No. US20080164768, which is incorporated herein by reference in its entirety, discloses a power conservation apparatus having a power inlet for providing power to the power conservation apparatus and an external appliance, a power outlet operable to be connected to the appliance, a relay coupling the power inlet and the power outlet, a current sensor operable to measure a current flow from the power outlet to the appliance, a threshold detector operable to receive an input in accordance with the current flow and operable to determine if the appliance is in a state of non-use, and a timer having a set-point; wherein the timer is activated upon the appliance entering the state of non-use and wherein the relay is opened upon the timer reaching the set-point, so as to prevent the power conservation apparatus and the appliance from drawing power from the power inlet. When in the "off" state, the AC power consumed by the apparatus and coupled appliances is zero.

U.S. Pat. No. 6,934,862, which is incorporated herein by reference in its entirety, discloses a device that monitors an appliance that receives power from a source. The device includes a first coupler that couples the device to the power source. A second coupler couples the device to the appliance. A monitoring circuit is connected to the first coupler and the second coupler to monitor power supplied by the source to the appliance. A communications circuit also is provided. The monitoring circuit provides data based on the monitored power to the communications circuit for output to the first coupler. The communications circuit may include a receiver that receives a signal from the first coupler to control the monitoring circuit. The communications circuit also may include a transceiver that receives a signal from the first coupler to control the monitoring circuit and to transmit monitored power data. The monitoring circuit includes a memory that stores an electronic signature of the appliance and a processor that determines an operating state of the appliance based on the electronic signature WIPO Publication No. WO07136213, which is incorporated herein by reference in its entirety, discloses a power outlet device comprising a relay socket main detachably inserted between a main power outlet and a plug of an electrical appliance. The relay socket main body includes a control circuit configured to internally and selectively supply and cut off a commercial AC power to the electrical appliance according to detection of current state corresponding to a power-on or power-off state of the electrical appliance and an external power-on request of the relay socket main body. The relay socket main body includes a control circuit configured to internally and selectively supply and cut off a commercial AC power to the electrical appliance according to detection of current state corresponding to a power-on or power-off state of the electrical appliance and an external power-on request of the relay socket main body. if a current value corresponding to non-operation is detected from the electrical appliance being operated, the control circuit confirm whether or not the non-operation is valid while monitoring the detected current value for a first time interval, and thereafter if the non-operation state is maintained after a stand-by while monitoring the detected current value for a second time interval, the control circuit internally cuts off the passage of the commercial AC power being supplied to the electrical appliance through the relay socket main body.

WIPO Publication No. WO05076416, which is incorporated herein by reference in its entirety, discloses a multifunctional multi-tap of intercepting a stand-by electric power and a control method employing the same which prevent big fire generated by leakage current by performing an interlocking control and a single-acting control in accordance with subordination of respective appliances using a illumination sensor or a body-detecting sensor.

U.S. Pat. No. 4,644,320, which is incorporated herein by reference in its entirety, discloses a home energy monitoring and control system for monitoring the electrical energy usage of a plurality of appliance loads. The system includes an energy monitor unit for each appliance load which plugs into a standard AC wall outlet and monitors power consumption and also has a power line transmitter/receiver for communicating with a master control station. The master control station receives energy usage data from each of the monitor units and stores the data for display in various user-selectable formats.

WIPO Publication No. WO0221664, which is incorporated herein by reference in its entirety, discloses a method and a system for the transmission/reception or communication of data and/or information on electric line between two electronic control devices, including: an electric, in particular a household appliance, having a first electronic control system and at least a first electric load; a monitoring or control device, having a second electronic control system, said device being located on said line between an electric power source and said first electric load. According to the invention, the transmission/reception or communication of data and/or information on said line is realized by means of an electric power modulation between said user and said device, and/or vice-versa.

BRIEF SUMMARY

Embodiments of the present invention provide an apparatus for detecting an electrical signature of an electrical appliance connected through an electrical outlet to the apparatus. The apparatus comprises a measurement unit, a processing unit, a control unit and an optional communications unit. The apparatus is connected to the appliance via an electrical outlet. Electrical measurements are performed by the apparatus, measuring the appliance electrical parameters such as the current and voltage. The measurements may be performed at any time (continuously or periodically), such as while the appliance is ON, while it is OFF and when it is electrically disconnected from the outlet. The apparatus may comprise a processing unit which may further calculate additional parameters such as the appliance power consumption (real and imaginary power), and the electrical impedance of the appliance. The apparatus and/or a remote management unit may perform an analysis of the electrical parameters measurements (e.g. the electrical current and voltage) in frequency and time domains. The control unit may be arranged to produce an electrical signal or to transmit an electrical signal from external sources via the electrical outlet to the electrical appliance, e.g. to send an AC sine voltage toward the appliance in case of an AC power system. The measurement unit is arranged to measure parameters of electrical signals via the electrical outlet, such as the voltage and current. The processing unit is further arranged to analyze the measured parameters in view of the electrical signal and detect the electrical signature of the electrical appliance therefrom. The processing unit may be further arranged to characterize predefined parameters of the electrical appliance utilizing the electrical signature.

Embodiments of the present invention provide a system for managing or reducing power consumption in a network including a plurality of electrical appliances connected via a plurality of electrical outlets to an electricity supplier and optionally to a demand control management system. The system comprises a plurality of apparatuses, each comprising a measurement unit, a processing unit a control unit and an optional communications unit. Each of the plurality of apparatuses is connected to at least one of the plurality of electrical outlets, such that every electrical outlet is associated to at least one apparatus. The system further comprises a processing unit embedded in at least one of plurality of apparatuses or integrated within an apparatus. Each control unit is arranged to produce or inject, and control, an electrical signal transmitted via the associated electrical outlet to the electrical appliance connected to the associated electrical outlet. Each measurement unit is arranged to measure electrical parameters of an electrical signal at the associated electrical outlet connected to the associated electrical appliance. Each processing unit is further arranged to analyze the electrical parameters measured in view of the electrical signal and detect the electrical signature of the associated electrical appliance therefrom, and further arranged to characterize predefined parameters of the associated electrical appliance utilizing the electrical signature. The processing unit is arranged to control the operation of the control units, to receive data related to the plurality of electrical appliances from the plurality of apparatuses; and to generate an estimation of the operative status and optionally the power consumption of the appliance, via an optional communications unit.

In embodiments, the operative status of the electrical appliance comprises at least one of: The type of the electrical appliance, the electrical connectivity of the electrical appliance to the outlet associated with the apparatus (i.e. check if there is an electrical connectivity and continuity between the appliance and that outlet, or alternatively if the appliance is electrically disconnected from the outlet), and the mode of operation of the electrical appliance.

Embodiments of the present invention provide a method of detecting a status or several statuses of an electrical appliance connected to an electrical outlet. The method comprises the stages: generating an electrical signal (e.g. an AC voltage) or letting an externally generated signal pass through the unit; injecting the electrical signal via the electrical outlet to the electrical appliance (e.g. allow the generated AC voltage signal toward the appliance); measuring electrical parameters of an electrical signal at the outlet connected to the appliance (e.g. measuring AC current and AC voltage); analyzing the measured electrical signal (e.g. performing an analysis in time domain and/or in frequency domain); detecting an electrical signature of the electrical appliance; characterizing predefined parameters of the electrical appliance utilizing the electrical signature; and detecting the status of the electrical appliance in relation to the predefined parameters.

In embodiments, the status of the electrical appliance comprises at least one of: The type of the electrical appliance, the electrical connectivity of the electrical appliance, the mode of operation of the electrical appliance.

Embodiments of the present invention provide a method of managing or reducing power consumption in a network including a plurality of electrical appliances connected via a plurality of electrical outlets to an electricity supplier and/or a demand control management system or service provider. The method comprises the stages: detecting a plurality of electrical signatures of the plurality of electrical appliances, such that each electrical signature corresponds to an electrical appliance; inferring statuses of each of the electrical appliances utilizing the corresponding electrical signatures and particularly verifying that the appliances are indeed electrically connected to the outlets and can be controlled by the control unit; optionally generating an estimation of the operative status and power consumption of the plurality of electrical appliances in the network, disabling the power provided to the appliances or reducing the appliance power consumption in other ways; checking repeatedly the signatures of the appliances after the power reduction operation has been taken and particularly verifying that the appliances are electrically connected to the outlets.

In embodiments, the method further comprises keeping power consumption of the network below a predefined threshold. In embodiments, the method further allow A power consumption programs which may actively reduce power consumption of an appliance taking into account its type and operational stage, and/or it may validate that actual power reduction was performed during peak and/or non-peak hours. For example, In embodiments a power consumption program for white goods (washers, dryers and dish washers), Air-conditioning units, or other appliance types. The program may credit customers for reduction of power during peak hours, upon request from a service company. The service company may use the status indications to verify that the target appliance was continuously connected to the outlet throughout the requested period, but was OFF or in Standby modes, and was not electrically disconnected or replaced during the requested period.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

Figure 1:
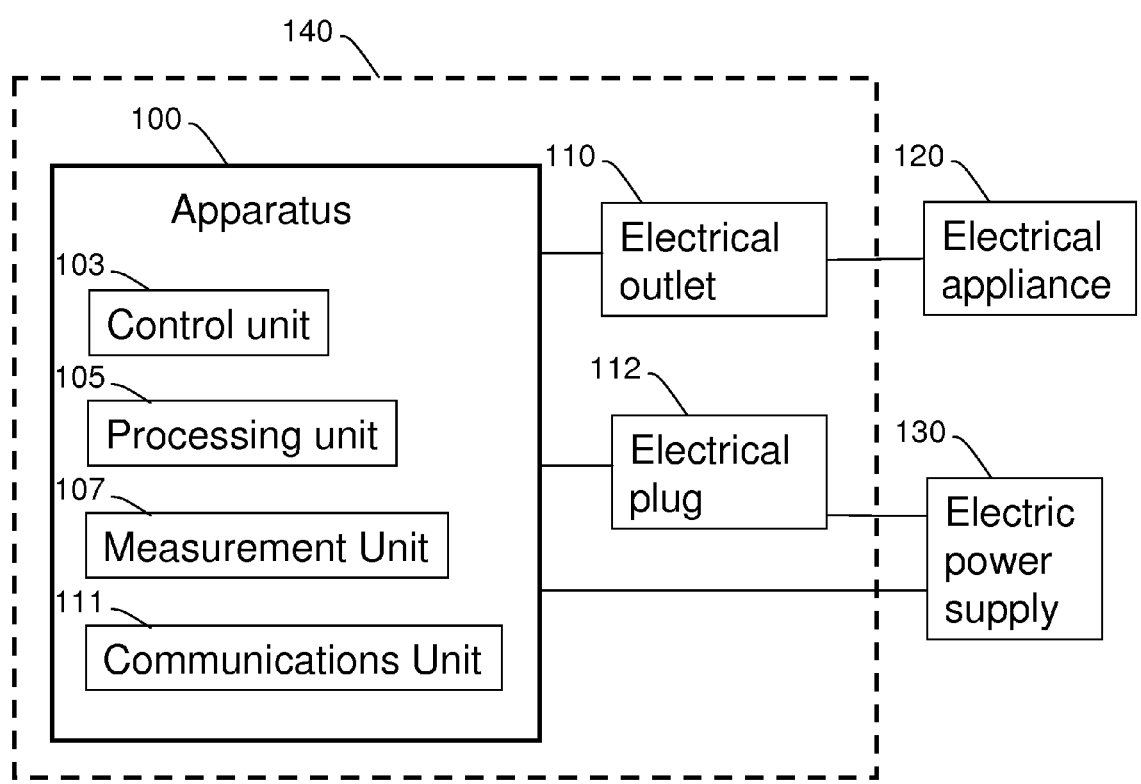
FIG. 1 is a high level schematic block diagram of an apparatus for detecting an electrical signature of an electrical appliance connected to an electrical outlet, and inferring statuses of each of the electrical appliances utilizing the corresponding electrical signatures, according to some embodiments of the invention.

The drawings together with the following detailed description make apparent to those skilled in the art how the invention may be embodied in practice.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usage of the following terms in the present disclosure is defined in a non-limiting manner: The term "appliance status indications" as used herein in this application, is defined as various objectives including but not limited to: (i) Checking continuous electrical connectivity between the outlet and an appliance; (ii) determining the appliance type; and (iii) checking the appliance operation stage. Different appliance status indications may be checked and utilized by the system depending on the embodiment. The term "electrical connectivity" is defined as the existence of an electronic connection between an outlet and an appliance, which allows the bi-directional flow of electrons between the appliance and the outlet. When there is an electrical connectivity—electric current can flow, whether constantly (as in the case of a resistive load) or intermittently (e.g. in the case of a diode bridge that allows electric current flow only during a portion of the voltage cycle).

FIG. 1 is a high level schematic block diagram of an apparatus 100 for detecting an electrical signature of an electrical appliance 120 connected via an electrical outlet 110, and inferring statuses of each of the electrical appliances utilizing the corresponding electrical signatures, according to some embodiments of the invention. Apparatus 100 comprises a processing unit 105, a measurement unit 107, a communications unit 111 and a control unit 103. Apparatus 100 may be connected to electrical outlet 110 e.g. integrated as part of a unit 140 comprising electrical outlet 110 and apparatus 100. Unit 140 may be connected to an electric power supply 130 and supply electricity to electric appliances 120. Apparatus 100 may also comprise an electrical plug 112 that may connect to electric power supply 130.

Control unit 103 is arranged to inject an electrical power signal, characterized by different electrical parameters such as current and voltage, and further characterized by parameters such as intensity, frequency spectrum, duration, temporal patterns of voltage and current, or various patterns. Control unit 103 may be arranged to produce the signal or allow an externally generated electrical power signal through the outlet. The electrical signal may be controlled and be modulated by control unit 103 in relation to electrical outlet 110, electrical appliance 120, network characteristics and performance related considerations.

According to some embodiments of the invention, control unit 103 is arranged to forward and transmit the electrical power signal via electrical outlet 110 to electrical appliance 120, and measurement unit 107 is arranged to detect electrical parameters of an electrical signal passing via electrical outlet 110 from electrical appliance 120. Forwarding/Transmitting the electrical signal and measuring the electrical parameters may be carried out recurrently, at predefined periods or related to parameters of the signal at the electrical outlet 110, electrical appliance 120, network characteristics and performance related considerations.

According to some embodiments of the invention, processing unit 105 is further arranged to analyze the measured parameters of the electrical signal in view of the electrical signal and detect the electrical signature of electrical appliance 120 therefrom. Changes in parameters of the measured parameters in respect to the electrical signal may be utilized to infer of the status of appliance 120, such as its connectivity to the outlet, appliance type and appliance operation stage. Processing unit 105 is further arranged to characterize predefined parameters of electrical appliance 120 utilizing the electrical signature. Such parameters may comprise may comprise consumption of electricity, temporal patterns thereof, operation modes etc.

According to some embodiments of the invention, electrical measurements may be performed at any time (continuously or periodically), such as while electrical appliance 120 is ON, while it is OFF and when it is electrically disconnected from electrical outlet 110. Processing unit 105 may further calculate additional parameters such as electrical appliance 120's power consumption (real and imaginary power), and the electrical impedance of electrical appliance 120. Processing unit 105 may be arranged to perform an analysis of the electrical parameters measurements (such as the electrical current and voltage, and optionally additional parameters such as the power and impedance measurements calculated out of them) in frequency and time domains.

According to some embodiments of the invention, the results of the analysis are utilized for determination of one, some or all the appliance status indications (defined above) and these appliance status indications are used for the purpose of applying energy management, energy billing and/or saving. For example, the objective of checking continuous connectivity of electrical appliance 120 to electrical outlet 110 may be used to determine if energy saving can be performed and for verifying that after a power reduction operation the appliance is still connected but does not consume electrical power. The objective of checking the appliance type and appliance operation status may be used to decide when to disconnect or limit power to the appliance and if turning off electrical appliance 120 could be harmful for electrical appliance 120.

In operation, apparatus 100 is arranged to detect the statuses of electrical appliance 120 by analyzing its signature, as received by a comparison of the returning signal to the original electric signal. Processing unit 105 performs an analysis process for determination of the appliance status indications. Possible embodiments of the analysis may include the following techniques: (i) comparing the impedance of electrical appliance 120 when it is ON and when it is OFF to a reference measurement of the impedance when electrical outlet 110 is disconnected on its appliance side, to determine whether electrical appliance 120 is connected or not; (ii) analysis of the electrical parameters such as the power consumption (real and imaginary power), the current and the voltage during the different states of electrical appliance 120, to determine appliance status such as whether electrical appliance 120 is connected, the appliance type and the appliance operational stage; (iii) frequency domain pattern recognition algorithms may be employed to determine the appliance status indications, e.g. use of spectral density of the current signal as a signature of an appliance at a certain operational stage; (iv) time-domain analysis of the electrical parameters such as the voltage and current measurements (including for example measuring the phase shift between the current and the voltage) during the different states of electrical appliance 120. Time-domain and/or frequency domain pattern recognition algorithms may be employed to determine the appliance type or its stage.

According to some embodiments of the invention, apparatus 100 may be arranged to analyze electrical characteristics of electrical appliance 120 that is electrically coupled to an electrical socket or an electrical plug, thereby indicating inter alia: The type of electrical appliance 120 connected to electrical outlet 110, whether electrical appliance 120 is electrically connected to electrical outlet 110 (regardless of whether the power switch of appliance 120 is turned on or off); and in which mode of operation electrical appliance 120 operates.

According to some embodiments of the invention, unit 140 may comprise electrical outlet 110, apparatus 100 and electrical plug 112 that may connect to electric power supply 130. According to some embodiments of the invention, apparatus 100 may be implemented as a so-called "smart socket" and may be a part of a larger system comprising a plurality of such "smart sockets". "Smart socket" may communicate with each other and provide important information relating to the electrical power consumption of an apartment or a facility on one hand, and allow controlling the power consumption via commands they receive. Apparatus 100 may be integrated with a plug and/or a socket into unit 140. Unit 140 may comprise apparatus 100, at least one socket (a female connector) and at least one plug (a male connector).

Figure 2:
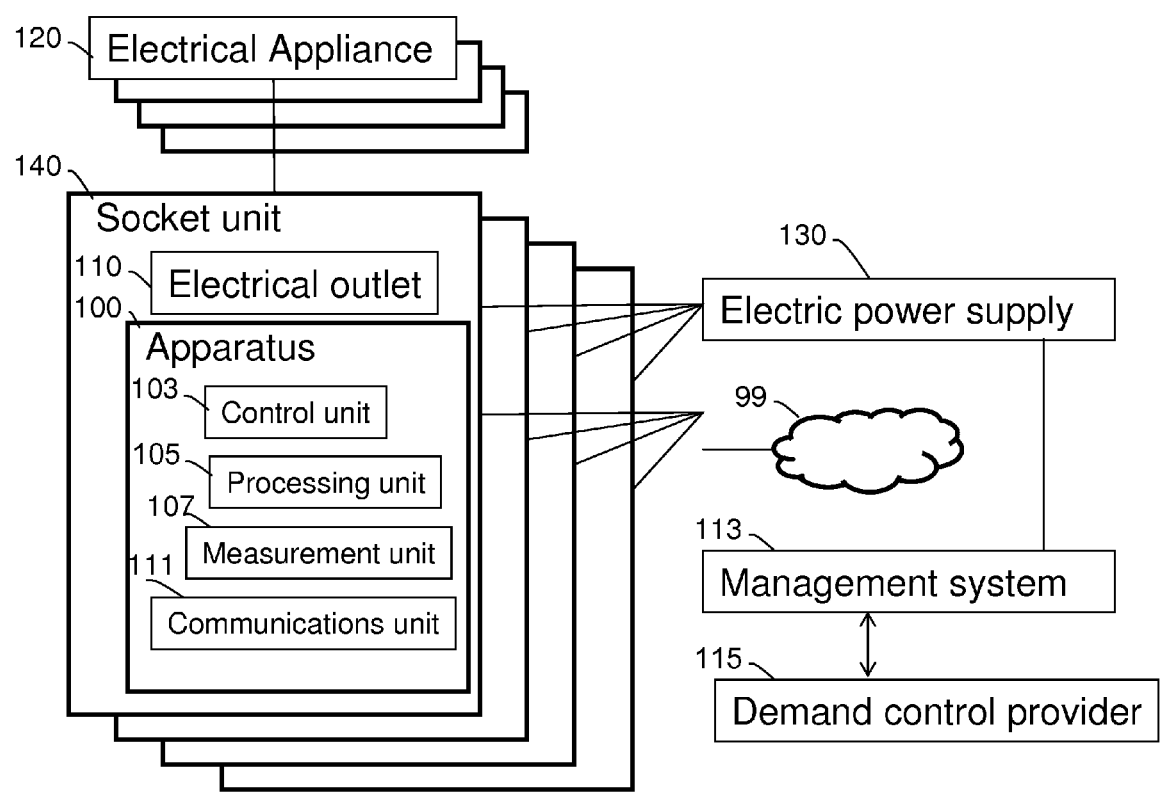
FIG. 2 is a high level block diagram illustrating a system for reducing power consumption in a network comprising electrical appliances connected via electrical outlets to an electricity supplier, to some embodiments of the invention.

FIG. 2 is a high level block diagram illustrating a system for reducing power consumption in a network 150 comprising electrical appliances 120 connected via electrical outlets 110 to an electricity supplier, according to some embodiments of the invention. The system comprises apparatuses 100, each comprising a processing unit 105; a measurement unit 107; a control unit 103, and optionally a communications unit 111. A management system 113 may be connected to unit 140 via a communication link 99 and communications units 111 of respective units 140. Each apparatus 100 is connected to at least one of the electrical outlets 110, such that every electrical outlet 110 is associated to at least one apparatus 100. For example, each apparatus 100 may be integrated together with one electrical outlet 110 into a unit 140. Alternatively, each apparatus 100 may be associated with several electrical outlets 110 to form units 140, according to the topology of network 150 and according to predefined criteria relating to the system. A unit 140 may serve one or more electrical appliances 120. Relating apparatuses 100 with electrical units 110 may be carried out in advance, while planning network 150, or be carried out after network 150 is established, e.g. by adding apparatuses 100 e.g. in form of components to existing electrical outlets 110.

According to some embodiments of the invention, electrical outlets 110 may be integrated within units 140.

According to some embodiments of the invention, management system 113 or control unit 103 may be arranged to limit power toward predefined electrical appliances 120 according to predefined rules. Limiting power may comprise disconnecting predefined electrical appliances 120.

According to some embodiments of the invention, the system may further comprise a demand control provider 115, utilizing communication between communications units 111 and management system 113 via communication link 99. Demand control provider 115 may regulate electricity consumption in relation to predefined rules.

According to some embodiments of the invention, management system 113 or control unit 103 may be arranged to use the appliance type, appliance operational mode and appliance connectivity statuses to decide whether and when to reduce or limit power to predefined electrical appliances 120.

According to some embodiments of the invention, management system 113 may connected to apparatuses 120, or to units 140, or to combinations of apparatuses 100 and units 140, depending on network structure, limitation relating to installation and to system design.

According to some embodiments of the invention, unit 140 may comprise at least one socket, at least one plug, or a combination thereof. Especially, unit 140 comprising a socket and a plug may serve as an intermediate connector between electrical appliances 120 and the network without having to make changes in either of them.

According to some embodiments of the invention, in each apparatus 100, control unit 103 is arranged to produce or to pass through an electrical signal such as AC voltage signal, and to inject the electrical signal via associated electrical outlet 110 to electrical appliance 120 that is connected to associated electrical outlet 110. Measurement unit 107 may be arranged to measure the electrical parameters of the electrical signal at electrical outlet 110 associated with electrical appliance 120. Management system 113 may communicate with control unit 103 using communications unit 111 regarding the production of the electrical power signals, and may control its timing and characteristics.

Processing unit 105 may be arranged to perform an analysis of the electrical parameters measurements measured by the measurement unit 107 (such as the electrical current and voltage, and optionally additional parameters such as the power and impedance measurements calculated out of them) in frequency and time domains. Processing unit 105 may be further arranged to analyze the measured signal parameters in view of the electrical signal and detect the electrical signature of associated electrical appliances 120 therefrom. Processing unit 105 may be arranged to characterize predefined parameters of associated electrical appliances 120 utilizing the electrical signature. Management system 113 may be arrange to carry out some of the analysis of the returning signals, or perform additional analysis to the analysis carried out by control units 103. Management system 113 may be involved in detecting the electrical signature of electrical appliances 120, e.g. perform part of the detection, control the operation of control units 103, deal with returning signals according to predefined criteria, and provide additional computational resources. Management system 113 may be involved in characterizing predefined parameters of electrical appliances 120, e.g. Management system 113 may hold a database supporting the analysis of the electrical signatures, a learning module for enhancing detection and characterization, a communication module for receiving data relating to electrical appliances 120, and so forth.

Management system 113 may be further arranged to control the operation of control units 103, to receive data related to electrical appliances 120 from apparatuses 100, and to generate an estimation of the operative status and power consumption of network 150 and connected electrical appliances 120.

Management system 113 may be further arranged to generate recommendations relating to the power consumption of network 150. For example, management system 113 may identify electrical appliances 120 in a standby mode for long periods, and suggest turning them completely off, identify electrical appliances 120 that deviate from an accustomed or predefined operation pattern and suggest checking them, identify exaggerated power consumption, of suggest changing to operation pattern that reduce peak consumption or consumption at predefined periods.

Management system 113 may be further arranged to keep power consumption of the network below a predefined threshold, e.g. by disconnecting predefined electrical appliances 120 according to predefined rules and criteria. Alternatively, management system 113 may be arranged to manage or allow managing the power consumption.

Advantageously, generating data relating to the mode of operation and consumption of all appliances in network 150 allows a better control of the overall power consumption. Specifically, the system may be characterized by the lack of need for installation and professional staff as the system detects electrical connectivity continuously, without the need for sending a professional staff for firm installation of the system at the customer premises, and by reliability emerging from the continuous communication between supplier and consumer for verifying that the power reduction operation was applied.

Figure 3:
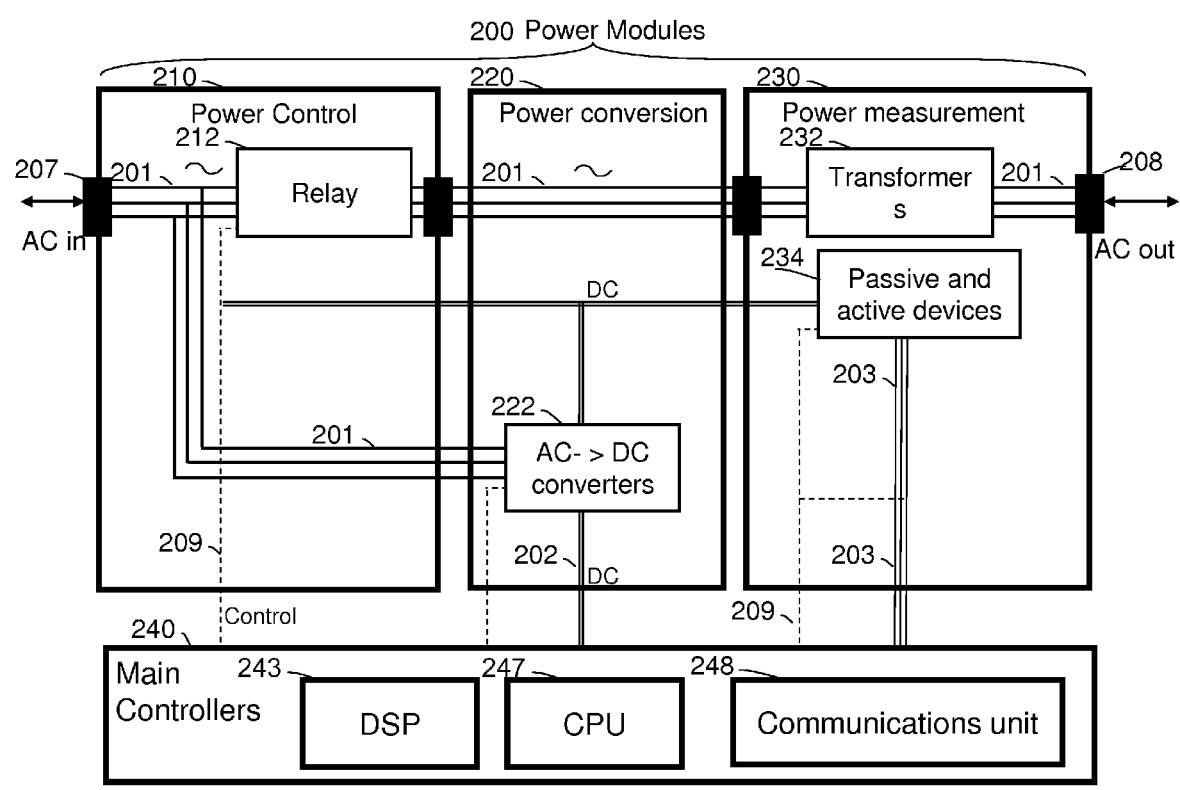
FIG. 3 is a high level block diagram illustrating an apparatus for detecting an electrical signature of an electrical appliance, inferring the statuses of the appliance and controlling the power to the appliance, according to some embodiments of the invention.

FIG. 3 is a high level block diagram illustrating an apparatus for detecting an electrical signature of an electrical appliance, inferring the statuses of the appliance and controlling the power to the appliance, according to some embodiments of the invention. The apparatus comprises power modules 200 and main controllers 240. Power modules 200 comprise a power control unit 210, a power conversion unit 220 and a power measurement unit 230. Power modules 200 are connected serially on a main power line 201 between an entrance 207 (may be implemented as electrical plug 112 in FIG. 1) and an exit 208 of the apparatus (may be implemented as electrical outlet 110 in FIG. 2). Main controllers 240 are fed by DC power signal 202 produced and controlled by power modules 200 and receive low voltage signals 203 indicating electrical parameters such as current indication, voltage indication, RMS current, RMS voltage etc. Main controllers 240 may control power modules 200 via control signals 209.

Power control unit 210 may comprise a relay 212. Power control unit 210 may be arranged to supply AC current, and deliver some of the AC current to power conversion unit 220. Relay 212 may be controlled by main controllers 240 via control signals 209.

Power conversion unit may comprise AC to DC converters 222 for generating DC current 202 to feed main controllers 240 and power measurement unit 230.

Main controllers 240 may comprise control modules that control power modules 200, as well as a DSP (Digital Signal Processor) 243, a CPU (Central Processing Unit) 247, arranged to control the functioning of the apparatus, and a communications unit 248 for communicating with external management systems. Other implementations of main controllers 240 or processing unit 105 or measurement unit 107 may comprise an ASIC (Application Specific Integrated Circuit), an FPGA (Field-Programmable Gate Array) or other electronic devices, circuits, and/or software modules.

Power measurement unit 230 may comprise transformers 232 and passive and active devices 234 for measuring electrical parameters, that are arranged to modulate AC current through power modules 200 and transmit the current to main controllers 240 for further processing and analysis.

Figure 4:
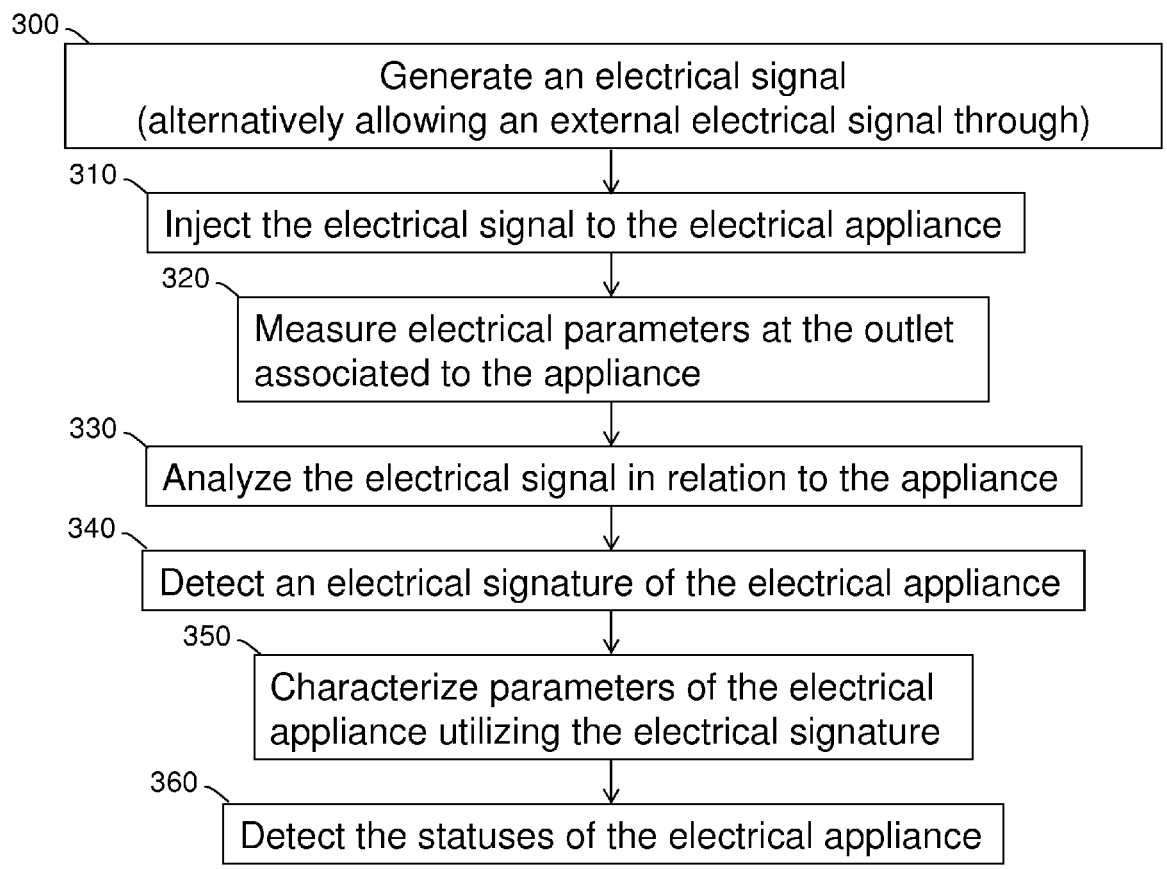
FIG. 4 is a high level flowchart illustrating a method of detecting a status of an electrical appliance connected to an electrical outlet according to some embodiments of the invention.

FIG. 4 is a high level flowchart illustrating a method of detecting a status of an electrical appliance connected to an electrical outlet according to some embodiments of the invention. The method comprises the stages: generating an electrical signal (stage 300); injecting the electrical signal via the electrical outlet to the electrical appliance (stage 310); measuring electrical parameters of an electrical signal at the outlet associated to the electrical appliance (stage 320); analyzing the electrical signal in relation to the electrical appliance (stage 330); detecting an electrical signature of the electrical appliance (stage 340); characterizing predefined parameters of the electrical appliance utilizing the electrical signature (stage 350); and detecting the status of the electrical appliance in relation to the predefined parameters (stage 360).

According to some embodiments of the invention, generating an electrical signal (stage 300) may be exchanged with letting an externally generated power signal pass through.

According to some embodiments of the invention, analyzing the parameters of the electrical signal (stage 330) may comprise an analysis of real and imaginary power consumption during appliance states. Analyzing the parameters of the electrical signal (stage 330) may comprise a time domain analysis and/or a frequency domain analysis of voltage and current measurements.

According to some embodiments of the invention, characterizing predefined parameters of the electrical appliance (stage 350) may comprise comparing an impedance of the electrical appliance when it is ON and an impedance of the electrical appliance when it is OFF to a reference impedance measurement when the electrical appliance is disconnected from the electrical outlet.

According to some embodiments of the invention, characterizing predefined parameters of the electrical appliance (stage 350) may comprise applying pattern recognition algorithms in at least one of: time domain, frequency domain.

According to some embodiments of the invention, the status of the electrical appliance comprises at least one of: The type of the electrical appliance, the manufacturer of the electrical appliance, the electrical connectivity of the electrical appliance to the outlet, the mode of operation of the electrical appliance.

Figure 5:
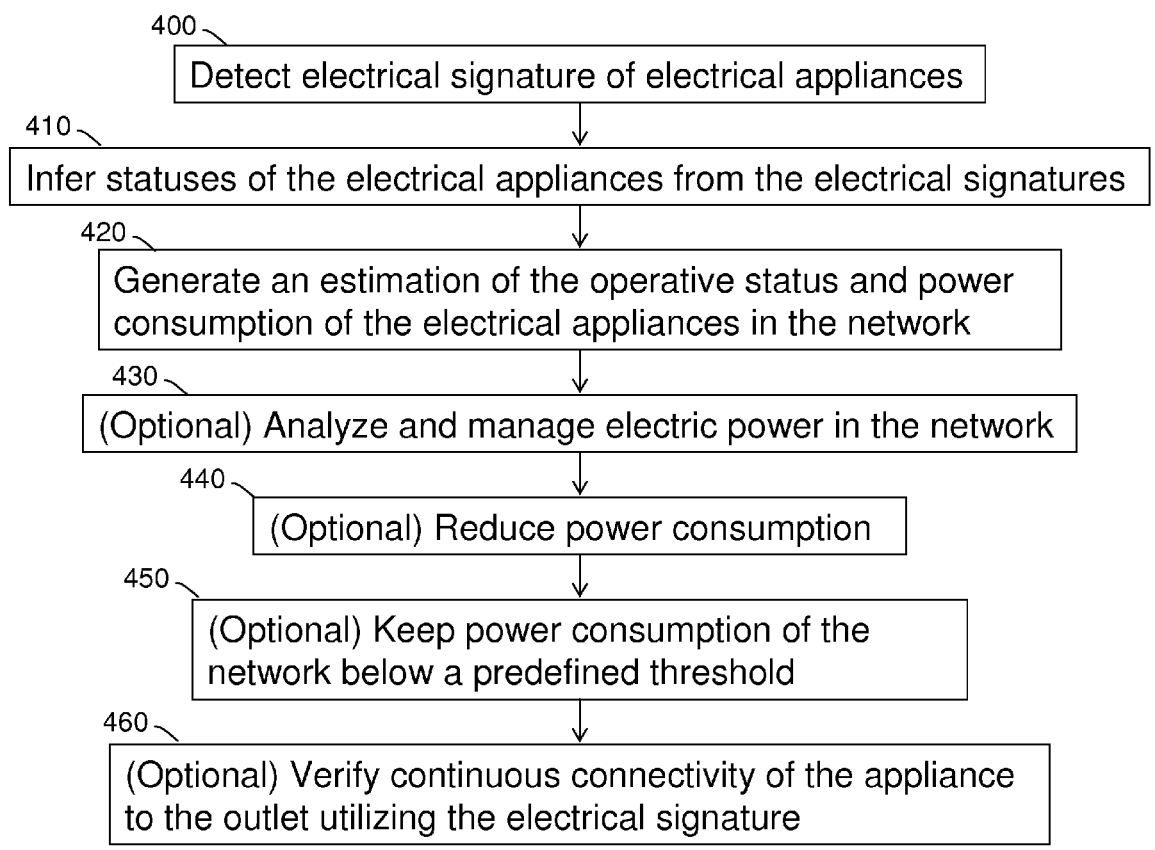
FIG. 5 is a high level flowchart illustrating a method of reducing power consumption in a network including a plurality of electrical appliances connected via a plurality of electrical outlets to an electricity supplier, in a reliable and an efficient manner, according to some embodiments of the invention.

FIG. 5 is a high level flowchart illustrating a method of reducing power consumption in a network including a plurality of electrical appliances connected via a plurality of electrical outlets to an electricity supplier, in a reliable and an efficient manner, according to some embodiments of the invention. The method comprises the stages: Detecting a plurality of electrical signatures of the plurality of electrical appliances (stage 400), such that each electrical signature corresponds to an electrical appliance or in some embodiments a group of appliances connected to a single outlet; inferring statuses of each of the electrical appliances utilizing the corresponding electrical signatures (stage 410); and generating an estimation of the operative status and power consumption of the plurality of electrical appliances in the network (stage 420).

According to some embodiments of the invention, the method may further comprise analyzing and managing electric power in the network (stage 430) by integrating data relating to all electrical appliances in the network.

According to some embodiments of the invention, the method may further comprise reducing power consumption in the network (stage 440), keeping power consumption of the network below a predefined threshold (stage 450), or generally managing or allowing to manage the power consumption. The method may further comprise any of: Generating recommendations relating to the power consumption of the network; actively keeping power consumption of the network below a predefined threshold; and disconnecting predefined electrical appliances according to predefined rules. The method may further comprise verifying the continuous connectivity of the appliance to the outlet utilizing the electrical signature (stage 460) to assure that the appliance was not disconnected from the power reduction system maliciously or unintentionally (if the connectivity between the outlet and the appliance is not verified while the power toward the appliance is limited/reduced—one may maliciously or unintentionally disconnect the appliance from the outlet, reconnect it to other outlets and in such way prohibit the power reduction intended to be performed by the system. Thus, detection of connectivity by way of signature analysis is imperative for proper system operation. The detection of the appliance type and its operative status may be further used by the apparatus to decide if and when to control the power consumed by the appliance)

According to some embodiments of the invention, keeping power consumption of the network below a predefined threshold (stage 450) may comprise limiting power toward predefined electrical appliances according to predefined rules. Limiting power may comprise disconnecting predefined electrical appliances.

According to some embodiments of the invention, the method may comprise using the appliance type, appliance operational mode and appliance connectivity statuses to help the control unit and/or the management system decide if to reduce/limit power to the appliance, when to reduce/limit power to the appliance.

According to some embodiments of the invention, the following examples for energy management, energy billing and/or saving actions may be applied by the system and method: (i) Demand Response, including various mechanisms that allow managing the electricity demand from customers in response to energy supply conditions; (ii) Differential pricing (also referred as Time of Use)—a rate schedule in which a electrical utility customer is charged different amounts for power consumption based on the date and the time; and (iii) Energy Efficiency—methods used to reduce the energy consumed, via use of more efficient electrical appliances and/or more efficient usage of the appliances.

According to some embodiments of the invention, various technologies and devices may be used for the communications between electrical outlet 110 and control unit 103 (e.g. in embodiments comprising control unit 103 separated from electrical outlet 110) or management system 113. Such technologies may comprise: (i) WiFi and/or the IEEE 802 standards that are referred by WiFi; (ii) Power Line Communications; (iii) Cellular communications, e.g. GPRS, GSM, UMTS and others; (iv) Zigbee and/or the IEEE 802 standards that are referred by Zigbee; (v) Internet communications over various media technologies and protocols; (vi) Radio communications; (vii) cable modem communications.

According to some embodiments of the invention, the system may comprise software running on servers, personal computers with various operating systems, application-specific appliances, a processor integrated in electrical outlet 110 or in a remote outlet, or various hardware devices. Such software may be associated with control unit 103 or management system 113 and programmed to enhance the performance of appliance 100 and the system.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   outputting a time-finite electrical signal together with an electrical power signal via an electrical power outlet onto an electrical appliance connected to the outlet;
   measuring a set of electrical parameters of the time-finite electrical signal affected by the electrical appliance, at the electrical outlet, being an electrical signature of the electrical appliance, wherein the electrical signal is uniquely associated with at least one state of operation of the connected appliance; and
   analyzing the electrical power signal at the outlet over time, by determining time periods in which the power signal is associated with the electrical signature, to yield at least one of the following: an indicator that the appliance is connected and operating; an indicator that the appliance has been shut down but remains electrically connected to the outlet; an indicator that one or more appliances has been electrically disconnected from the outlet; an indicator that an appliance has been disconnected from the outlet and later re-connected; an indicator that the appliance has been replaced with a different appliance at the same outlet; and an indicator that at least one additional appliance has been connected in parallel to the appliance, via the outlet.

2. The method of claim 1, further comprising providing data files to the electrical appliance by identifying the electrical appliance by the electric signature, to yield a reduced operation cost of the electrical appliance or reduced power during peaks.

3. The method of claim 1, further comprising applying a power consumption program for at least one electrical appliance by identifying a type and an operational stage of the at least one electrical appliance by the electric signature, to yield a reduced operation cost of the at least one electrical appliance or reduced power during certain periods, wherein the power consumption program yields a reduction in power consumption by validating that the at least one electrical appliance selected from a specified group of high power consumption electrical appliances was connected and non operative in specified peak power consumption periods.

4. The method of claim 1, further comprising associating a power consumption program selected by determining a class of an identified operational stage of the electrical appliance.

5. The method of claim 3, wherein the power consumption program comprises disconnecting electrical appliances at standby mode, as identified by their electric signature.

6. The method of claim 5, wherein the analyzing the measured electrical signal parameters comprises an analysis of real and imaginary power consumption during appliance states.

7. The method of claim 5, wherein the analyzing the measured electrical signal parameters comprises a time domain and frequency domain analyses of voltage and current measurements.

8. The method of claim 5, wherein the characterizing predefined parameters of the electrical appliance comprises comparing an impedance of the electrical appliance when it is ON and an impedance of the electrical appliance when it is OFF to a reference impedance measurement when the electrical appliance is disconnected from the electrical outlet.

9. A data processing system comprising:
a control unit arranged to output a time-finite electrical signal together with an electrical power signal via an electrical power outlet onto an electrical appliance connected to the outlet;
a measurement unit arranged to measure a set of electrical parameters of the time-finite electrical signal affected by the electrical appliance, at the electrical outlet, being an electrical signature of the electrical appliance, wherein the electrical signal is uniquely associated with at least one state of operation of the connected appliance; and
a processing unit arranged to analyze the electrical power signal at the outlet over time, by determining time periods in which the power signal is associated with the electrical signature, to yield at least one of the following: an indicator that the appliance has been shut down but remains connected to the outlet; an indicator that an appliance has been disconnected from the outlet and later re-connected; an indicator that the appliance has been replaced with a different appliance at the same outlet; and an indicator that at least one additional appliance has been connected in parallel to the appliance, via the outlet.

10. The data processing system of claim 9, wherein the control unit is further arranged to provide data files to the electrical appliance by identifying the electrical appliance by the electric signature, to yield a reduced operation cost of the electrical appliance or reduced power during certain periods.

11. The data processing system of claim 9, wherein the control unit is further arranged to generate an operational program for the electrical appliance by identifying an operational stage of the electrical appliance by the electric signature, to yield a reduced operation cost of the electrical appliance or reduced power during certain periods.

12. The data processing system of claim 11, wherein the operational program comprises disconnecting electrical appliances at standby mode, as identified by their electric signature.

13. The data processing system of claim 9, wherein the processing unit is further arranged to analyze real and imaginary power consumption during appliance states.

14. The data processing system of claim 9, wherein the processing unit is further arranged to analyze the measured electrical parameters comprises in a time domain and in a frequency domain of voltage and current measurements.

15. The data processing system of claim 9, wherein the processing unit is further arranged to compare an impedance of the electrical appliance when it is ON and an impedance of the electrical appliance when it is OFF to a reference impedance measurement when the electrical appliance is disconnected from the electrical outlet.

* * * * *